Jan. 22, 1924.  
E. H. DANIEL  
TRACTOR POWER LIFT  
Filed May 1, 1922

Inventor  
Earle H. Daniel  
By Staley P. Bowman  
Attorneys

Jan. 22, 1924.  1,481,283
E. H. DANIEL
TRACTOR POWER LIFT
Filed May 1, 1922   2 Sheets-Sheet 2
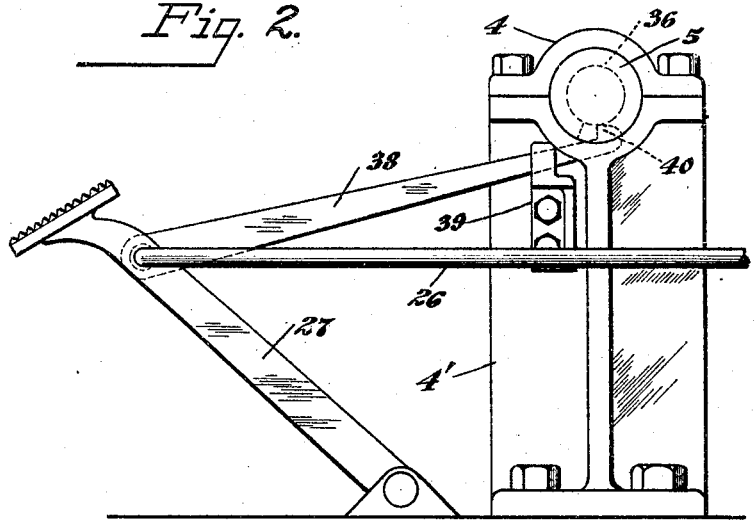
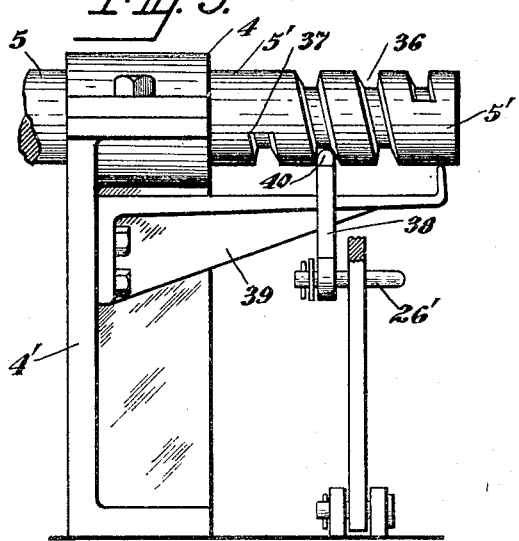
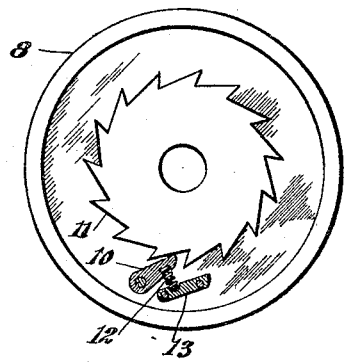
Inventor
Earle H. Daniel
By Staley Borman
Attorneys Patented Jan. 22, 1924.

1,481,283

UNITED STATES PATENT OFFICE.

EARLE H. DANIEL, OF SPRINGFIELD, OHIO, ASSIGNOR, BY MESNE ASSIGNMENTS, TO R. W. JOHNSTON.

TRACTOR POWER LIFT.

Application filed May 1, 1922. Serial No. 557,602.

*To all whom it may concern:*

Be it known that I, EARLE H. DANIEL, a citizen of the United States, residing at Springfield, in the county of Clark and State of Ohio, have invented certain new and useful Improvements in Tractor Power Lifts, of which the following is a specification.

This invention relates to improvements in power lifting mechanism, it more particularly relating to mechanism of this character designed for use in connection with a tractor for lifting implements, such as plows, which are pivotally connected with the tractor frame, the lifting power being derived from the tractor motor.

The object of the invention is to provide means for auomatically limiting the raising movement of the mechanism so as to cause the implement to be raised to a predetermined height by the lifting mechanism; a more specific object being to provide for automatically throwing the lifting mechanism out of operation at the end of a predetermined raising movement of the same by an arrangement which is simple in construction and effective in operation.

In the accompanying drawings:

Fig. 2 is an enlarged side elevation of a portion of the same.

Fig. 3 is an enlarged rear view of a portion of the same.

Fig. 4 is a detail of the brake drum.

Figure 1:
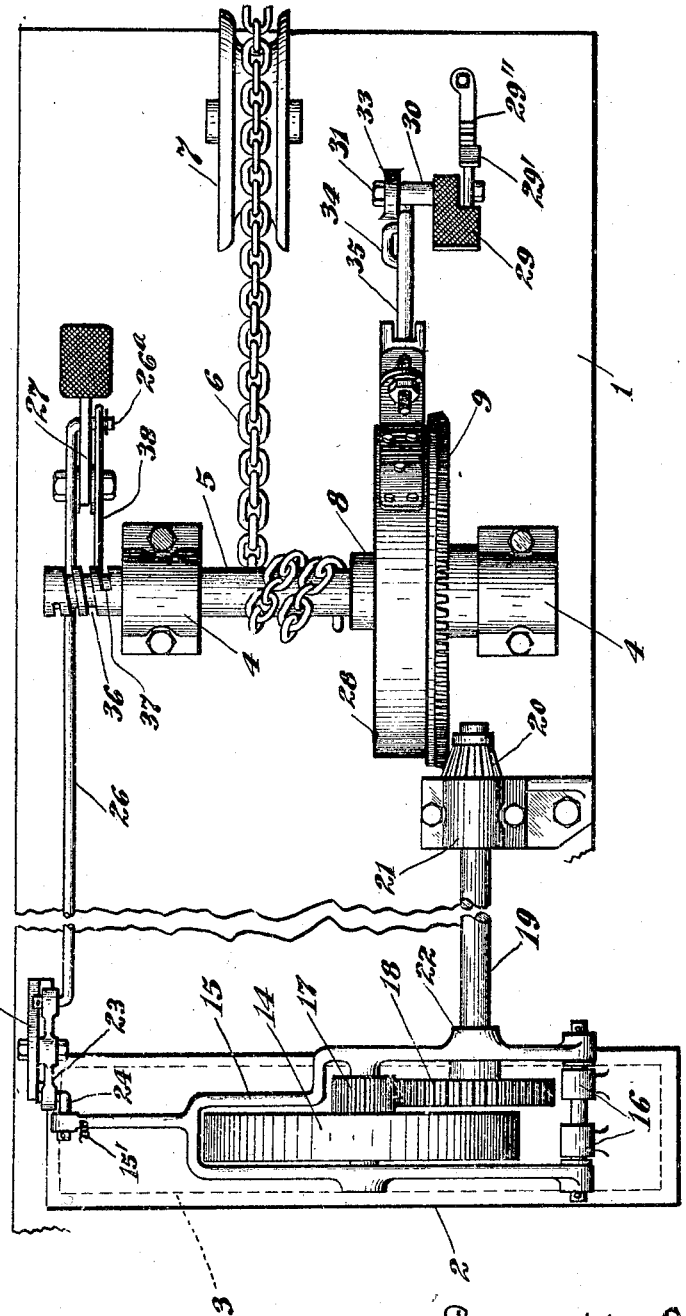
Fig. 1 is a top plan view of the mechanism.

Referring to the drawings, 1 represents a platform suitably supported at the rear end of the tractor frame and 2 a housing for the fly-wheel, shown in dotted line at 3. Mounted in bearings 4 on the platform is a transverse shaft 5 to which is connected a chain 6 which extends rearwardly over a sheave 7 mounted on the extreme rear end of the platform. Loose on the shaft is a brake drum 8 and fast to the shaft is a beveled gear 9, a portion of which extends into the drum and has a pawl 10 normally held in engagement with a ratchet-wheel 11, fast to the drum, by a spring 12 interposed between the pawl and a fixed part 13, so that when the gear is revolved in the manner to be described, the drum will remain stationary, the pawl ratcheting over the teeth of the ratchet wheel, but preventing reverse movement of the shaft when the drum is locked in the manner to be described. Motion is imparted to the gear by the tractor motor. A friction wheel 14 is mounted to rotate in a frame 15 having one end hinged in bearings 16 at the upper end of a standard on the housing 2 and this friction wheel has an operative connection to the gear 9 through the pinion 17, connected with the wheel, gear 18, meshing with the pinion and mounted on the forward end of a shaft 19, and beveled pinion 20 on the rear end of the shaft in mesh with the gear 9. The shaft 19 is mounted in a bearing 21 on the platform and a bearing 22 in the frame, the shaft having sufficient inherent resiliency to permit of a slight rocking movement of the frame. The free end of the frame has a pivoted connection with one arm of a bell-crank lever 23 through a curved link 24, the bell crank being pivotally supported by a standard 25. The other arm of the lever has a connection through a rod 26, with the pivoted arm 27 of a foot pedal, whereby pressure applied by the foot rocks the arm 27 downwardly and through the connections described forces the friction wheel 14 against the fly-wheel to thereby rotate the shaft 5, wind up the chain and consequently lift the implement or other devices attached to the chain. A brake band 28 cooperates with the drum to hold the shaft against reverse movement, the band being contracted about the drum by a foot pedal 29, having a connection with a sleeve 30 loose on a pin 31, carried by a bracket 3, and connected with the band in well known way through the connections 34 and 35. A detent 29' having a pivoted connection with the sleeve 30 cooperates wih a stationary rack 29'' to hold the band against the drum with the desired degree of friction. In practice, the band is tightened on the drum sufficiently to sustain the weight of the device to be lifted before the friction wheel is engaged with the fly-wheel, so that when the friction wheel is disengaged the device will be held in raised position by the brake band and drum.

Means are provided for automatically disengaging the friction wheel from the fly-wheel at the end of a predetermined raising movement of the parts. The shaft 5 is extended beyond one of the bearings 4, as indicated at 5' and provided with a spiral groove 36, terminating in an abrupt shoulder 37 at its inner end. Loosely connected with the bent end 26ª of the connecting rod 26 is a finger 38 which rests upon a bracket 39 projecting from the bearing support 4', and extends in line with and beneath the extension 5' of the shaft. The free end of the finger is formed with a hook 40 and lies in the groove 36. As a result of this construction, when the shaft is revolved to wind up the lifting chain, the end of the finger 38 follows the groove 36 which the loose connection between the finger and part 26ª permits, until its hook contacts the shoulder at the end of the groove, whereupon continued rotation of the shaft pulls the finger forwardly and likewise the lever 27 and connecting rod 26; which in turn through the connections described raises the friction wheel from the fly-wheel and stops the rotation of the shaft 5, the shaft being then held stationary by the brake band, which, as before explained, has been previously set to give the desired braking effect to suspend the load. When it is desired to lower the load, this may be accomplished by releasing the detent and maintaining the desired frictional engagement between the brake drum and band by pressure of the foot upon the pedal 29. A coil spring 15' connected with the frame 15 and any convenient stationary part serves to normally hold the friction wheel out of engagement with the fly-wheel.

The finger will be initially so placed in the spiral groove as to impart to it the proper travel to trip the mechanism at the end of the necessary rotation of the shaft required to give the desired height of lift. When it is desired to lift the implement, such as a plow, attached to the tractor, the operator depresses the foot pedal and holds it depressed with his foot until the mechanism becomes automatically disengaged in the manner described; or, if desired, the pedal may be released prior to that time to lift the implement to any point between maximum and minimum, the automatic devices simply preventing the implement from being lifted beyond a certain point to obviate the danger of breakage of the parts.

Having thus described my invention, I claim:

1. In a mechanism of the character described, a rotatable winding device having a flexible connector, power mechanism for rotating said device in one direction including a friction wheel cooperating with a power operated rotatable member, a brake for controlling the reverse movement of said winding device, and means associated with said winding device for throwing said friction wheel out of contact with said rotatable member after a predetermined movement of said winding device.

2. In a mechanism of the character described, a rotatable winding device having a flexible connector, power mechanism for rotating said device in one direction including a pivoted frame, and a friction wheel carried by said frame cooperating with a power operated rotatable member, a brake for controlling the reverse movement of said winding device, and means associated with said winding device for rocking said frame to throw said friction wheel out of contact with said rotatable member after a predetermined movement of said winding device.

3. In a mechanism of the character described, a rotatable winding device having a flexible connector, power mechanism for rotating said device in one direction, a brake for controlling the reverse movement of said winding device, said power mechanism including a pivoted frame, a friction wheel mounted in said frame and cooperating with a power operated rotatable member, a lever connected to said frame, and means associated with said winding device and connected with said lever whereby said friction wheel is thrown out of engagement with said rotatable member after a predetermined movement of said winding device.

4. In a mechanism of the character described, a rotatable winding device having a flexible connector, power mechanism for rotating said device in one direction, said device being free to turn in the reverse direction, a brake for controlling the reverse movement of said winding device, a member rotatable with said winding device and having a spiral groove, a finger arranged to travel in said groove, means for operating said finger after a predetermined movement thereof, and means associated with said finger for rendering said power mechanism inoperative upon the operation of said finger.

5. In a mechanism of the character described, a rotatable winding device having a flexible connector, power mechanism for rotating said device in one direction, said device being free to turn in the reverse direction, a brake for controlling the reverse movement of said winding device, said winding device having associated therewith a spiral groove, a travelling member cooperating with said groove and having a part arranged to be engaged by a shoulder in said groove after a predetermined movement thereof, and means connected with said travelling member for throwing said power mechanism out of operation when said part is engaged by said shoulder.

6. In a mechanism of the character described, a rotatable winding device having a flexible connector, power mechanism for rotating said device in one direction, said device being free to turn in the reverse direction, a brake for controlling the reverse movement of said winding device, a foot pedal for controlling said power mechanism, and means associated with said winding device and having a connection with said foot pedal whereby said power mechanism is rendered inoperative after a predetermined movement of said winding device.

7. In a mechanism of the character described, a rotatable winding device for a flexible connector, power mechanism for rotating said device in one direction, a brake for controlling the reverse movement of said winding device, a foot pedal for controlling said power mechanism, said winding device having associated therewith a spiral groove having an abrupt shoulder at one end, a travelling member having a part thereof located in said groove whereby contact with the said shoulder will impart a movement to said travelling member, a connection between said travelling member and said foot pedal whereby movement of said member will render said power mechanism inoperative after a predetermined movement of said winding device.

In testimony whereof, I have hereunto set my hand this 28th day of April 1922.

EARLE H. DANIEL.